(12) United States Patent
Hori et al.

(10) Patent No.: US 10,819,176 B2
(45) Date of Patent: Oct. 27, 2020

(54) ELECTRIC MOTOR

(71) Applicant: Mitsubishi Electric Corporation, Tokyo (JP)

(72) Inventors: Shusuke Hori, Tokyo (JP); Shinsuke Hemmi, Tokyo (JP); Tatsuki Kawashima, Tokyo (JP); Satoru Akutsu, Tokyo (JP); Yu Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 16/081,747

(22) PCT Filed: Mar. 29, 2016

(86) PCT No.: PCT/JP2016/060162
§ 371 (c)(1),
(2) Date: Aug. 31, 2018

(87) PCT Pub. No.: WO2017/168574
PCT Pub. Date: Oct. 5, 2017

(65) Prior Publication Data
US 2019/0068018 A1 Feb. 28, 2019

(51) Int. Cl.
*H02K 3/28* (2006.01)
*H02P 25/22* (2006.01)
(Continued)

(52) U.S. Cl.
CPC .............. *H02K 3/28* (2013.01); *H02K 1/274* (2013.01); *H02K 21/16* (2013.01); *H02P 6/10* (2013.01);
(Continued)

(58) Field of Classification Search
CPC ........... H02K 3/28; H02K 1/274; H02K 21/16
(Continued)

(56) References Cited

U.S. PATENT DOCUMENTS 5,723,931 A * 3/1998 Andrey ..................... H02K 3/28
242/433
2005/0174006 A1* 8/2005 Kolomeitsev .......... H02K 1/148
310/180

(Continued)

FOREIGN PATENT DOCUMENTS

JP 5106888 B2 12/2012
JP 5304427 B2 10/2013
(Continued)

OTHER PUBLICATIONS

Communication dated Dec. 12, 2018, from European Patent Office in counterpart application No. 16896794.1.

*Primary Examiner* — Terrance L Kenerly
(74) *Attorney, Agent, or Firm* — Sughrue Mion, PLLC; Richard C. Turner

(57) ABSTRACT

Provided is an electric motor including a permanent magnet rotor and two sets of multi-phase windings serving as coil windings of a stator. The coil windings are wound around teeth by concentrated winding. The multi-phase windings of one of the two sets are wound around every other tooth by skipping one tooth in between. The multi-phase windings of another of the two sets are wound around the teeth skipped by the multi-phase windings of the one set. Adjacent coil windings of the two sets are wound in the same direction. A control unit configured to supply power to the coil windings includes control circuits independent of each other to provide one control circuit for each of the two sets of coil windings, and the control unit controls the control circuits with two sets of control signals having a phase difference of 150 degrees.

20 Claims, 8 Drawing Sheets

(51) Int. Cl.
  *H02P 6/10* (2006.01)
  *H02K 1/27* (2006.01)
  *H02K 21/16* (2006.01)
  *H02K 29/03* (2006.01)

(52) U.S. Cl.
  CPC ......... *H02P 25/22* (2013.01); *B60L 2240/421* (2013.01); *H02K 29/03* (2013.01)

(58) Field of Classification Search
  USPC .......................................................... 310/198
  See application file for complete search history.

(56) References Cited

U.S. PATENT DOCUMENTS

| | | | |
|---|---|---|---|
| 2010/0289372 A1 | 11/2010 | Taniguchi et al. | |
| 2018/0248432 A1* | 8/2018 | Ikeda | H02K 3/522 |
| 2018/0248433 A1* | 8/2018 | Okazaki | H02K 3/18 |

FOREIGN PATENT DOCUMENTS

| | | | |
|---|---|---|---|
| WO | 02/052693 A2 | 7/2002 | |
| WO | 02/052693 A3 | 7/2002 | |

* cited by examiner

ELECTRIC MOTOR

CROSS REFERENCE TO RELATED APPLICATIONS

This application is a National Stage of International Application No. PCT/JP2016/060162, filed on Mar. 29, 2016.

TECHNICAL FIELD

The present invention relates to an electric motor.

BACKGROUND ART

Existing winding structures of electric motors, particularly permanent magnet synchronous motors, are roughly divided into two types. One of the winding methods is concentrated winding (see Patent Literature 1, for example), and the other is distributed winding (see Patent Literature 2, for example). There is also an electric motor in which two sets of windings are prepared and driven with different phases to suppress noise and ripples generated during the driving of the electric motor by controlling the two sets of windings so that the noise and the ripples are canceled.

CITATION LIST

Patent Literature

[PTL 1] JP 5106888 B2
[PTL 2] JP 5304427 B2

SUMMARY OF INVENTION

Technical Problem

In a motor device disclosed in Patent Literature 1, a first three-phase winding and a second three-phase winding, which are wound by distributed winding, are controlled with drive signals having a phase difference of Π/6 from each other. Distributed winding is higher in winding factor than concentrated winding, and is accordingly said to be suitable for high output.

However, as compared with concentrated winding, distributed winding in which a winding is wound between slots set apart at a given pitch makes a winding machine complicate and the length of a connecting wire between the slots long, and consequently tends to be high in coil end height and long in axis length.

In a drive system for a rotating electric machine disclosed in Patent Literature 2, on the other hand, a first winding and a second winding, which are wound by concentrated winding, are controlled with phases having a phase difference of Π/6. This device, too, has an effect of reducing torque ripples.

However, coils are wound around slots in reverse directions in a U phase of a first group and its adjacent X phase of a second group. It is therefore difficult to wind coils of the first-group phases U, V, and W and coils of the second-group phases X, Y, and Z at the same time. Moreover, the coil of the first-group U phase and the coil of the next first-group U phase six slots away from the former cannot be connected directly to each other because of their winding directions, which means that a separate connecting wire is required to establish wire connection therebetween.

The present invention has been made in view of the above, and an object of the present invention is therefore to provide an electric motor in which two sets of multi-phase windings are wound by concentrated winding, and which is capable of simplifying coil winding and improving workability.

Solution to Problem

In order to achieve the above-mentioned object, according to one embodiment of the present invention, there is provided an electric motor including: a permanent magnet rotor; and two sets of multi-phase windings serving as coil windings of a stator, the coil windings being wound around teeth by concentrated winding, the multi-phase windings of one of the two sets being wound around every other tooth by skipping one tooth in between, the multi-phase windings of another of the two sets being wound around the teeth skipped by the multi-phase windings of the one of the two sets, wherein adjacent coil windings of the two sets are wound in the same direction, and wherein a control unit configured to supply power to the coil windings includes control circuits independent of each other to provide one control circuit for each of the two sets of coil windings, and the control unit is configured to control the control circuits with two sets of control signals having a phase difference of 150 degrees.

Advantageous Effects of Invention

According to one embodiment of the present invention, it is possible to provide the electric motor in which two sets of multi-phase windings are wound by concentrated winding and which is capable of simplifying coil winding and improving workability.

DESCRIPTION OF EMBODIMENTS

Figure 1:
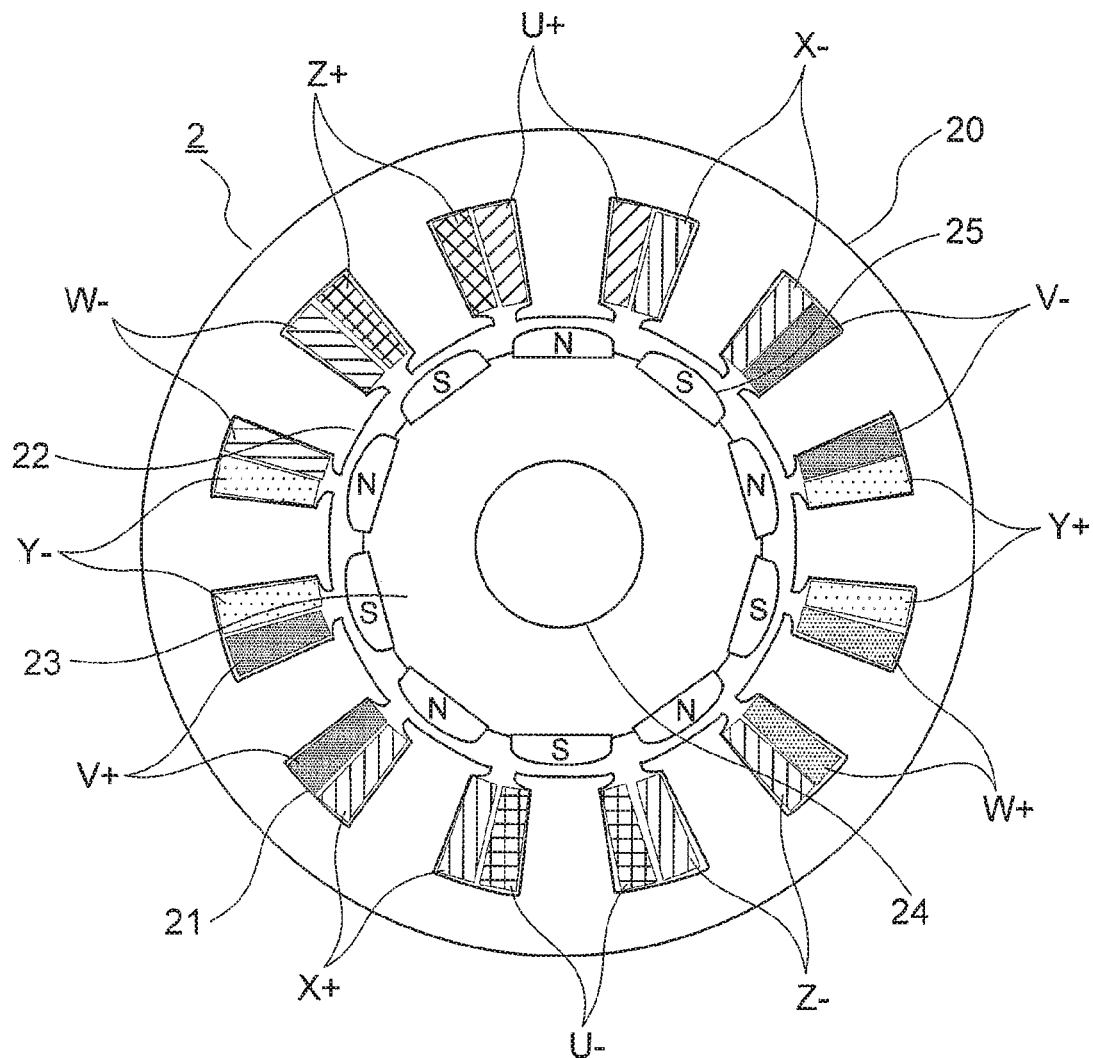
FIG. 1 is a schematic diagram of a motor according to a first embodiment of present invention.

Now, embodiments of the present invention are described with reference to the accompanying drawings. In the drawings, the same reference symbols represent the same or corresponding parts.

First Embodiment

A first embodiment of the present invention is described below with reference to the drawings. The description takes a permanent magnet inner rotor motor as an example of an electric motor. FIG. 1 is a schematic diagram for illustrating a stator and rotor of a motor 2 in a direction orthogonal to an output axis 24. A rotor 23, which is configured to rotate with the output axis 24, is provided around the output axis 24, which is at the center. N poles and S poles of permanent magnets 25 are alternated along the outer circumference of the rotor 23, and ten poles are arranged in total. The permanent magnets 25 are arranged at equal angular intervals. A stator 20 is arranged coaxially with a gap between the stator 20 and the permanent magnets 25. The stator 20 is provided with twelve slots 21 and twelve teeth 22, which store coil windings, and are alternated in a circumferential direction of the stator 20.

Figure 2:
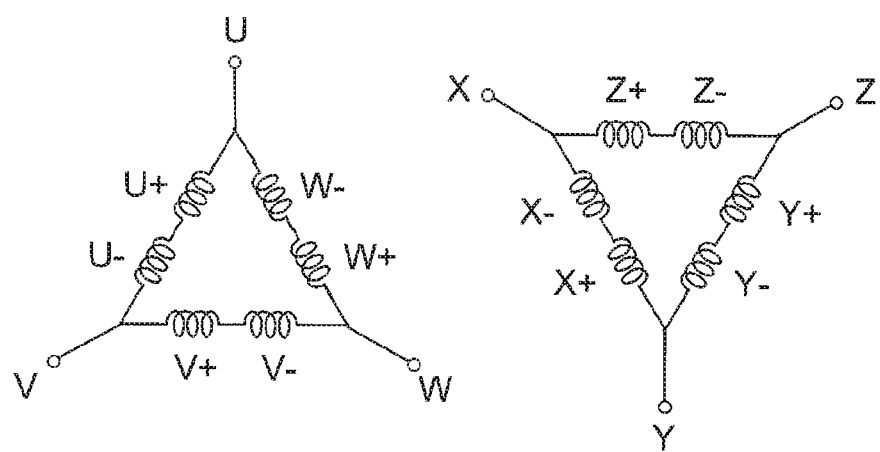
FIG. 2 is a diagram for illustrating a winding circuit diagram of the motor according to the first embodiment.

A coil winding is wound from one slot to an adjacent slot so as to cradle one tooth 22. Two sets of three-phase coils are schematically illustrated in FIG. 2. As illustrated in FIG. 2, a coil winding circuit is made up of twelve coils in total, which form two sets of Δ (delta) connections with a first set including U+, U−, V+, V−, W+, and w−, and a second set including X+, X−, Y+, Y−, Z+, and Z−. The motor according to the first embodiment has the slot arrangement illustrated in FIG. 1 and the circuit of FIG. 2.

Figure 3:
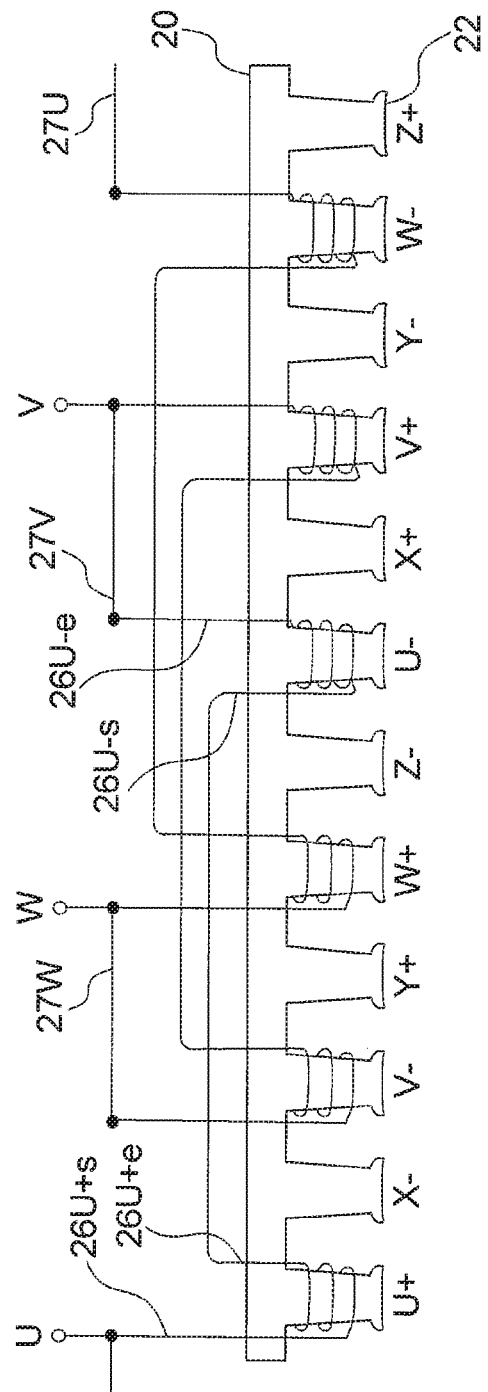
FIG. 3 is a winding circuit diagram of the motor according to the first embodiment.
Figure 4:
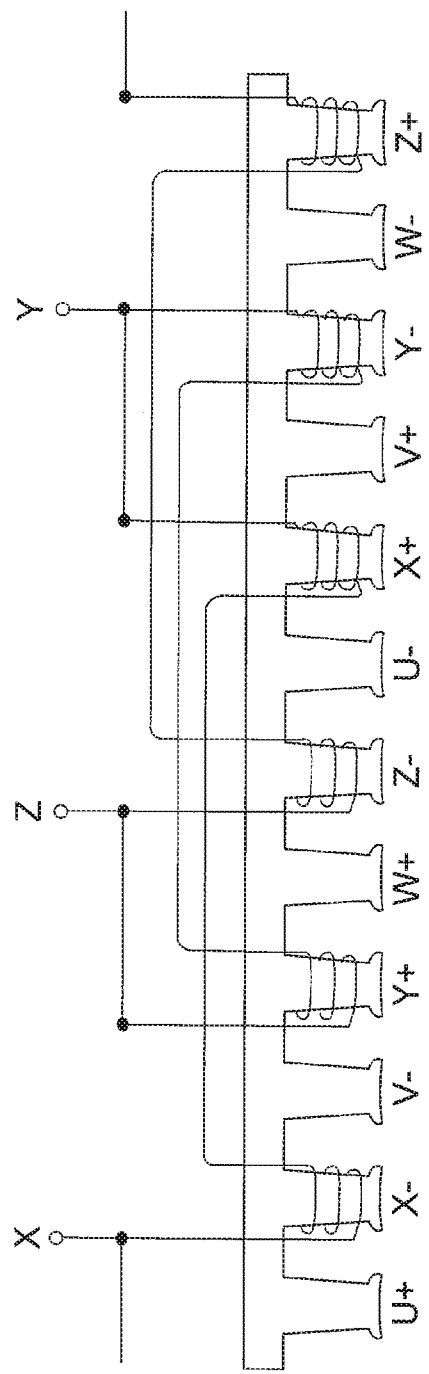
FIG. 4 is another winding circuit diagram of the motor according to the first embodiment.

Details of the windings are described further with reference to FIG. 3 and FIG. 4. FIG. 3 and FIG. 4 are diagrams in which the stator 20 is linearly developed to illustrate that coils are wound around twelve teeth 22. For easy understanding, the two sets of coil windings are sorted by set so that one set is illustrated in FIG. 3 while the other set is illustrated in FIG. 4. FIG. 3 and FIG. 4 are overlaid on each other in the actual motor 2. The set including U, V, and W and the set including X, Y, and Z have the same winding structure. In the case of three teeth 22 (U+, V−, and W+) from the left of FIG. 3, windings are wound a plurality of times in a right-handed direction from the left toward the right in FIG. 3. Windings are wound in the reverse direction, namely, the left-handed direction, around the next three teeth 22 (U−, V+, and W−). In each tooth, winding starts on the left side of the tooth and ends on the right side of the tooth to give every tooth the same winding structure, which makes the mode of a lead-out line for coil winding the same in every tooth. Further, the winding end (26U+e) in U+ and the winding start (26U−s) in U−, which is sixth tooth from U+, are connected by a continuous wire without interruption. Connecting wires 27U, 27V, and 27W are separate coil wires or electricity conductors, and are connected to coil wires or electricity conductors by, for example, welding. Points of the connection are indicated by black circle marks in FIG. 3.

Similarly, coil windings having X, Y, and Z phases are wound in the right-handed direction around the teeth 22 located in the left half of FIG. 4, and in the left-handed direction around the teeth 22 located in the right half of FIG. 4, and coil windings of the same phase are made from the same continuous wire. Adjacent teeth in the left half of FIG. 3 and FIG. 4 accordingly have the same winding direction. Adjacent teeth in the right half of FIG. 3 and FIG. 4 are similarly wound continuously, though in a direction reverse to the winding direction in the left half. A half of the coils are thus wound in the same direction in the same manner, with a continuous wire at one tooth extending to the sixth tooth from the one tooth, and adjacent coils among the remaining half of the coils are also wound in the same direction, though in a direction reverse to the winding direction of the first half of coils, from a continuous line, which means that one set of three-phase coils can be wound simultaneously. This also makes it possible to wind two sets of six coil windings at the same time, thereby simplifying the structure of a winding machine, and the identical winding specifications help to shorten the time required for working. The same structure is used to lead a wire at the start and end of winding, and both A (delta) connection and Y-connection can be selected as a wire connection formed above the stator. The effect of reducing torque ripples can be obtained also when Y-connection is selected.

The motor according to the first embodiment is a 5-pole pair/10-pole, 12-slot motor, and has two sets of three-phase coil windings, which are structured so that windings of the two sets are inserted in adjacent slots and wound in the same direction. Accordingly, the following applies to adjacent coil windings, and the mechanical angle is calculated as 72 degrees, which is converted into an electrical angle of 360 degrees:

$$360(degrees)/5 \text{ (pole pairs)}=72(degrees)\rightarrow 360(degrees)$$

Further, the following applies to the condition on the angle between slots, and the mechanical angle is calculated as 30 degrees, which is converted into an electrical angle of 150 degrees:

$$360(degrees)/12 \text{ (slot)}=30(degrees)\rightarrow 150(degrees)$$

A phase shift between the slots illustrated in FIG. 1 to FIG. 4 is calculated from the above as an electrical angle of 150 degrees.

Figure 5:
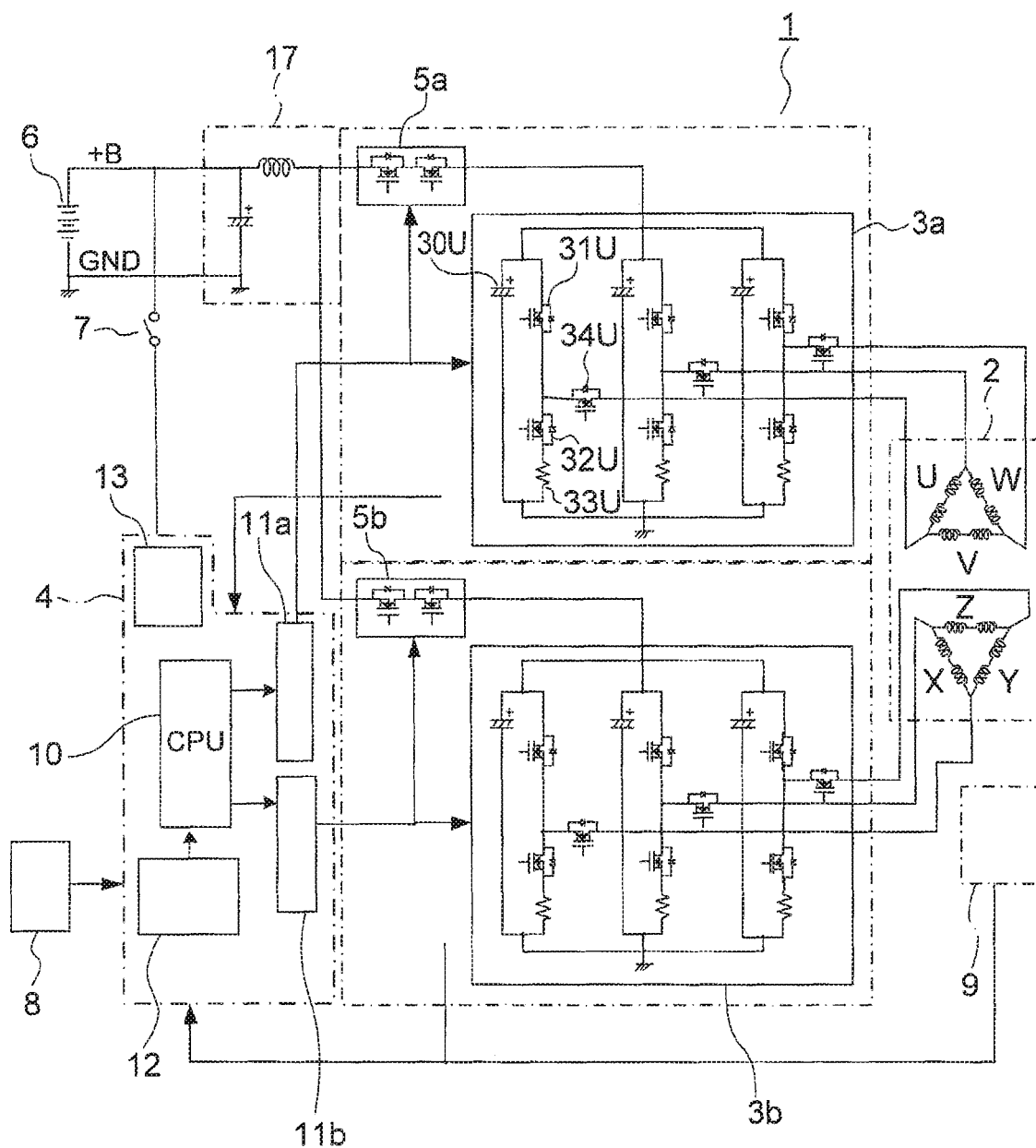
FIG. 5 is an overall circuit diagram in the first embodiment.

A control unit 1, which controls the motor 2, is described next with reference to an overall circuit diagram of FIG. 5. FIG. 5 is an overall circuit diagram taking an electric power steering device as an example in which an electric motor and a control device (the control unit 1) for controlling the electric motor make up an electric power steering device for a vehicle. The control unit 1, which drives the motor 2, supplies power to two sets of coil windings of the motor 2. A battery 6 mounted on the vehicle, an ignition switch 7, and sensors 8 including a torque sensor, which detects a steering torque of a steering wheel, and a vehicle speed sensor are set up outside the control unit 1. The interior of the control unit 1 includes what are called inverter circuits 3a and 3b, which supply a current to the motor 2, a small-signal circuit, which includes a power source circuit 13, an input circuit 12, a CPU 10, and drive circuits 11a and 11b, a filter 17, and power source switching elements 5a and 5b, which serve as power source relays.

The connection and operation of the components in the control unit 1 described above are outlined. When a driver switches on the ignition switch 7, the power source circuit 13 supplies a constant voltage to the CPU 10, the input circuit 12, and the drive circuits 11a and 11b. Power is supplied to the inverter circuits 3a and 3b via the filter 17 (a capacitor and a coil). Information from the sensors 8, which include the vehicle speed sensor and the torque sensor among others, is sent to the CPU 10 via the input circuit 12. Based on the information, the CPU 10 calculates a control amount, which indicates the amount of power to be supplied to the motor 2. The calculated control amount is output via the drive circuits 11, which are the first stage on the output side. Rotation angle information and other pieces of information provided by a rotation sensor 9, which detects voltages or currents of components in the inverter circuits 3a and 3b and which detects the rotation of the output axis of the motor 2, are also transmitted to the CPU 10 via the input circuit 12. The power source switching elements 5a and 5b, which have an open/close relay function, are inserted in a +B power source line. The switching elements are, for example, FETs in which elements in a forward direction and a backward direction with respect the direction of current supply are arranged in series as parasitic diodes. With the switching elements, power supply can forcibly be shut off in the event of, for example, a failure in the inverter circuits 3a and 3b or the motor 2. The driving of the switching elements 5, too, is controlled by the CPU 10 via the drive circuits 11.

Two identical circuits are built in as the inverter circuits 3a and 3b for two sets of three-phase windings (the U phase, the V phase, the W phase, the X phase, the Y phase, and the Z phase) of the motor 2, and has the same configuration for each phase, which includes three switching elements and a capacitor 30 among others. The configuration includes two switching elements arranged in series to serve as an upper arm and a lower arm (in FIG. 5, the upper-arm/lower-arm switching elements for the U phase are illustrated as a representative and denoted by 31U and 32U), and a motor relay switching element (in FIG. 5, the motor relay switching element for the U phase is illustrated as a representative and denoted by 34U), which has a relay function for opening and closing a path between the motor winding and the upper-arm/lower-arm switching elements. The upper-arm/lower-arm switching elements are driven by PWM based on a command from the CPU 10, and a capacitor (in FIG. 5, the capacitor for the U phase is illustrated as a representative and denoted by 30U) is accordingly connected in the vicinity of the upper-arm/lower-arm switching elements for the purpose of suppressing noise. A shunt resistor (in FIG. 5, the shunt resistor for the U phase is illustrated as a representative and denoted by 33U) is also connected in order to detect a current flowing in the motor 2. A voltage between the upper-arm/lower-arm switching elements or a voltage at a terminal of the motor winding (the U phase, the V phase, or the W phase), and the voltage of the shunt resistor are transmitted to the CPU 10. The CPU 10 thus grasp the difference between a control command value (target value) and an actual current or voltage value, and uses the difference in what is called feedback control and the determination of a failure in a component as well. The CPU 10 also calculates the rotational position or rotational speed of the motor from a rotation angle detected by the rotation sensor 9, and uses the calculated value as control timing.

Figure 6:
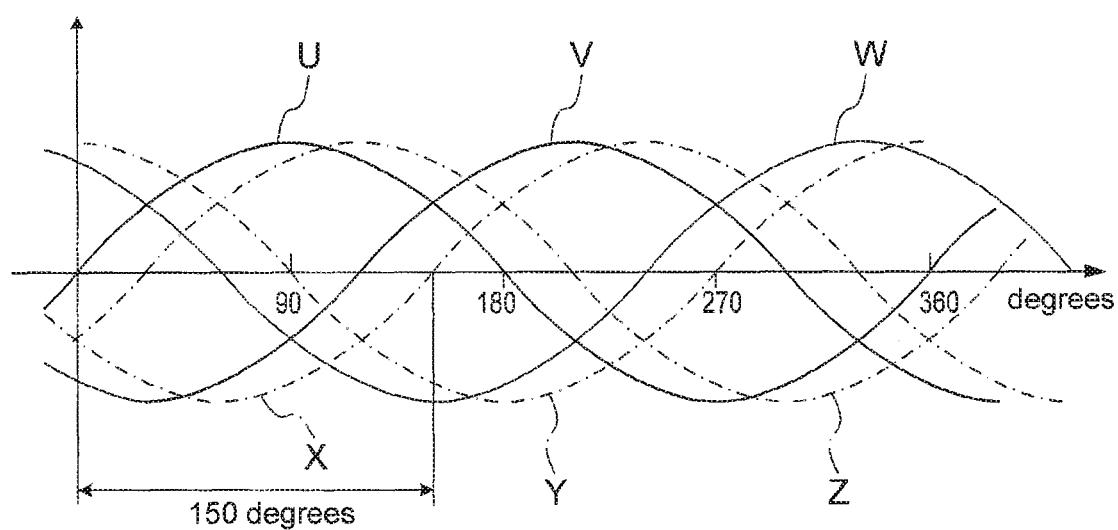
FIG. 6 is a graph for showing a waveform of power supply to the motor according to the first embodiment.

A control method to be used by the CPU 10 of the control unit 1 to control the inverter circuits 3a and 3b is described next with reference to FIG. 6. FIG. 6 is a graph for showing the waveforms of power supply to motor coils. The inverters 3a and 3b are controlled independently, and a current substantially in a sine wave pattern is caused to flow by sine wave PWM control. Solid lines U, V, and W in FIG. 6 indicate timing at which the current is supplied to the U-phase motor coil, the V-phase motor coil, and the W-phase motor coil, respectively. The phases are controlled at a phase difference of 120 degrees because three-phase control is conducted. Similarly, dot-dash lines X, Y, and Z in FIG. 6 indicate timing of current supply to the X-phase motor coil, the Y-phase motor coil, and the Z-phase motor coil, respectively, and the phases have a phase difference of 120 degrees. The phase difference between the first set, namely, the phases U, V, and W, and the second set, namely, the phases X, Y, and Z, is 150 degrees, which is ⅚Π (in electrical angle). The 150-degree phase difference derives from the fact that the phase difference between the two sets of coil windings is 150 degrees in FIG. 1 to FIG. 4, and is also used in control as 150-degree phase difference control. The CPU 10 can easily generate outputs having any phase difference from rotation angle information provided by the rotation sensor 9 of FIG. 5.

As described above, in an electric motor including two sets of multi-phase coil windings, adjacent coil windings of the two sets are wound in the same direction, a control circuit for controlling current supply to one set of coil windings and a control circuit for controlling power supply to the other set of coil windings are controlled independently of each other, and the phase difference between the two sets is set to 150 degrees. The coil winding structure is accordingly simplified, with the result that a machine for winding is simplified and that the time required for working is shortened.

Second Embodiment

A second embodiment of the present invention is described next with reference to FIG. 7 to FIG. 10. The second embodiment is the same as the first embodiment except for what is described below.

Figure 7:
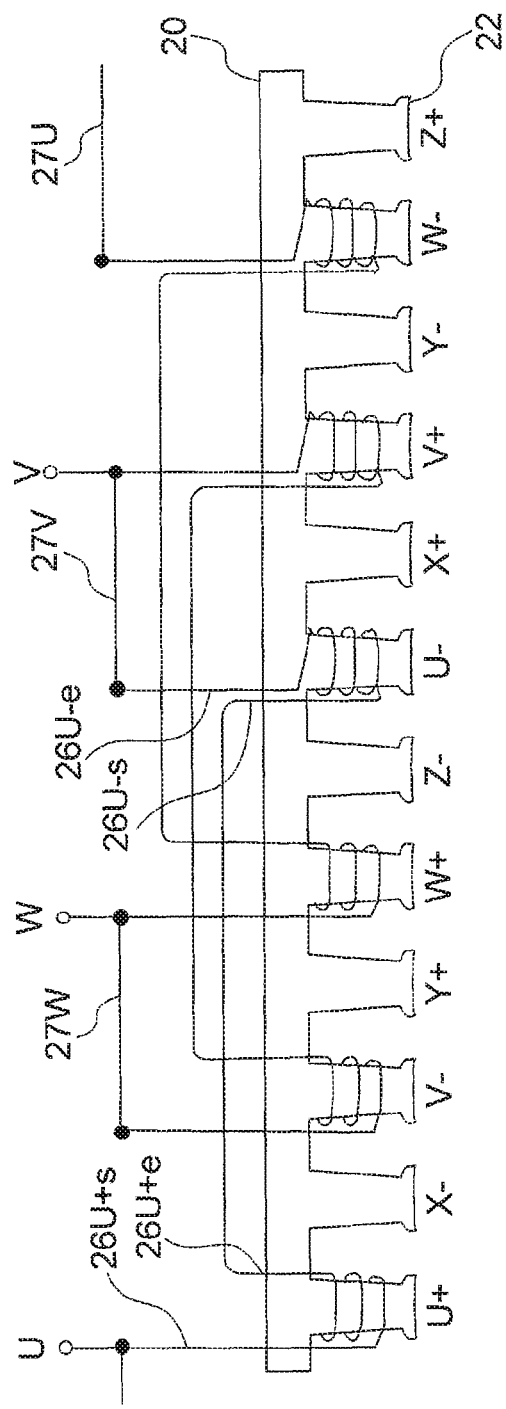
FIG. 7 is a winding circuit diagram of a motor according to a second embodiment of present invention.
Figure 8:
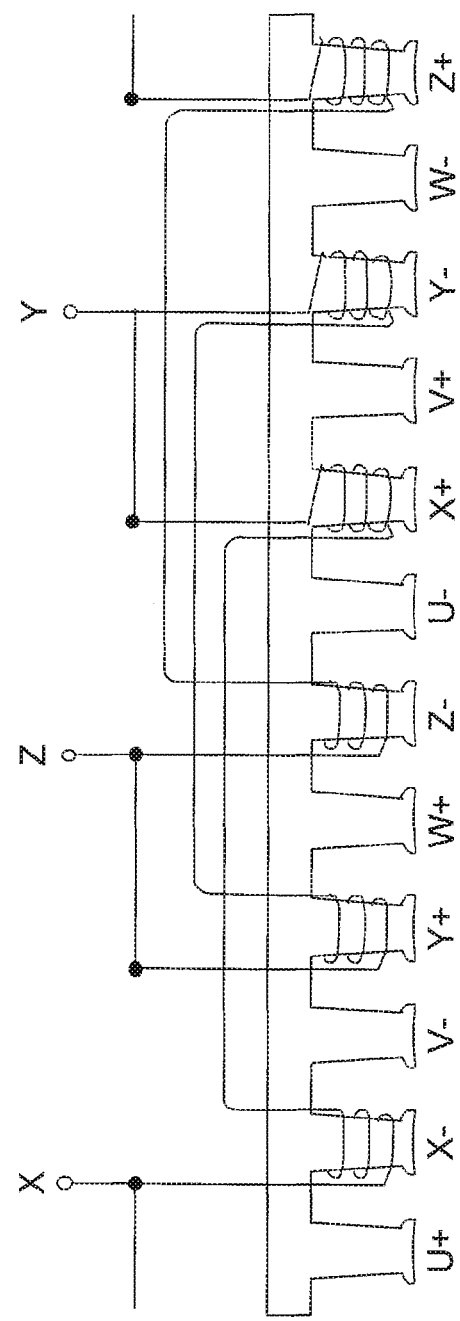
FIG. 8 is another winding circuit diagram of the motor according to the second embodiment.
Figure 9:
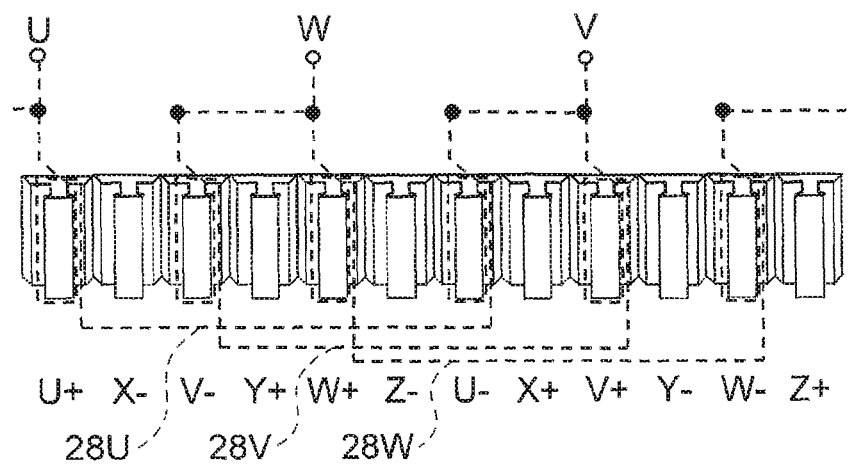
FIG. 9 is a diagram for illustrating winding specifications of the motor according to the second embodiment.
Figure 10:
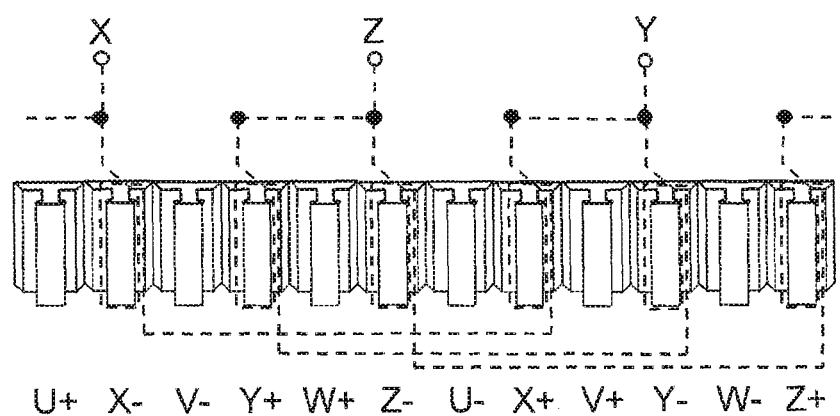
FIG. 10 is another diagram for illustrating winding specifications of the motor according to the second embodiment.

FIG. 7 and FIG. 8 are circuit diagrams in the second embodiment of the present invention. The circuit of FIG. 7 and FIG. 8 is the same as the circuit of FIG. 3 and FIG. 4, but differs in how wires are taken out at the start and end of winding. While a wire is wound in a uniform manner in each tooth in FIG. 3 and FIG. 4 by starting on the left side of the tooth and ending on the right side of the tooth, winding start wires in U+, V−, W+, X−, Y+, and Z− and winding end wires in U−, V+, W−, X+, Y−, and Z+ are led out from the same direction in FIG. 7 and FIG. 8. By leading out lead-out lines that are required to be connected in the same direction irrespective of whether the lead-out lines are at the start of winding or at the end of winding, the handling of lead-out lines is made easy and the time required for working can be shortened. This structure also allows continuous lines 28 to be placed opposite from lead-out lines with respect to a motor axis direction as illustrated in FIG. 9 and FIG. 10. The continuous wires 28 are thus placed opposite from the crosslines in the axis direction, thereby increasing the space for the connecting wires 27 and making the connecting wires 27 easy to handle.

According to the second embodiment, an intermediate or lower-power electric motor in which two sets of multi-phase windings are wound by concentrated winding can simplify coil windings and improve workability as in the first embodiment. The reduction of torque ripples during driving and the suppression of noise caused by the torque ripples are accomplished as well.

Although the details of the present invention are specifically described above with reference to the preferred embodiments, it is apparent that persons skilled in the art may adopt various modifications based on the basic technical concepts and teachings of the present invention.

REFERENCE SIGNS LIST 20 stator, 21 slot, 22 tooth, 23 rotor, 25 permanent magnet, 27 connecting wire, 28 continuous wire

The invention claimed is:

1. An electric motor, comprising:
a permanent magnet rotor; and
two sets of three-phase windings serving as coil windings of a stator, the coil windings being wound around teeth by concentrated winding, the three-phase windings of one of the two sets being wound around every other tooth by skipping one tooth in between, the three-phase windings of another of the two sets being wound around the teeth skipped by the three-phase windings of the one of the two sets, wherein three consecutive pairs of adjacent coil windings of the two sets are wound in one direction and another three consecutive pairs of adjacent coil windings of the two sets are wound in an opposite direction, and wherein a control unit configured to supply power to the coil windings includes control circuits independent of each other to provide one control circuit for each of the two sets of coil windings, and the control unit is configured to control the control circuits with two sets of control signals having a phase difference of 150 degrees.

2. An electric motor according to claim 1, wherein the coil windings of one phase belonging to one of the two sets are wound around at least two teeth by concentrated winding, and a winding end at one of the at least two teeth and a winding end at another of the at least two teeth are connected by a continuous wire.

3. An electric motor according to claim 2, wherein the coil winding of each phase is wound by concentrated winding so that winding starts on one side of a tooth and ends on another side of the tooth.

4. An electric motor according to claim 3, further comprising:
5-pole pair/10-pole permanent magnets; and
twelve slots.

5. An electric motor according to claim 3, wherein the electric motor is configured to be included in an electric power steering device for a vehicle.

6. An electric motor according to claim 2, wherein, in the coil winding of the each phase, winding start wires each being led out of six adjacent teeth and requiring connection by a connecting wire, and winding end wires each being led out of remaining six adjacent teeth and requiring connection by a connecting wire, are led out from one same side of the teeth.

7. An electric motor according to claim 6, further comprising:
5-pole pair/10-pole permanent magnets; and
twelve slots.

8. An electric motor according to claim 6, wherein the electric motor is configured to be included in an electric power steering device for a vehicle.

9. An electric motor according to claim 2, wherein, in the coil winding of the each phase, a continuous wire connecting windings of the same phase apart from each other by a given number of teeth is taken out to an opposite side in an axis direction of the electric motor from lead-out lines requiring connection by connecting wires.

10. An electric motor according to claim 9, further comprising:
5-pole pair/10-pole permanent magnets; and
twelve slots.

11. An electric motor according to claim 9, wherein the electric motor is configured to be included in an electric power steering device for a vehicle.

12. An electric motor according to claim 2,
wherein, in the coil winding of the each phase, a winding direction of one tooth is reversed from a winding direction of a tooth having the same phase as the one tooth and distanced from the one tooth by a given number of teeth, and
wherein the connecting wire configured to connect the one tooth and the tooth having the same phase and distanced by a given number of teeth is a continuous wire.

13. An electric motor according to claim 12, further comprising:
5-pole pair/10-pole permanent magnets; and
twelve slots.

14. An electric motor according to claim 12, wherein the electric motor is configured to be included in an electric power steering device for a vehicle.

15. An electric motor according to claim 2, further comprising:
5-pole pair/10-pole permanent magnets; and
twelve slots.

16. An electric motor according to claim 15, wherein the electric motor is configured to be included in an electric power steering device for a vehicle.

17. An electric motor according to claim 2, wherein the electric motor is configured to be included in an electric power steering device for a vehicle.

18. An electric motor according to claim 1, further comprising:
5-pole pair/10-pole permanent magnets; and
twelve slots.

19. An electric motor according to claim 18, wherein the electric motor is configured to be included in an electric power steering device for a vehicle.

20. An electric motor according to claim 1, wherein the electric motor is configured to be included in an electric power steering device for a vehicle.

* * * * *